March 8, 1927.  E. J. HAMMER ET AL  1,620,019
BEET HARVESTER
Filed March 11, 1925   6 Sheets-Sheet 6
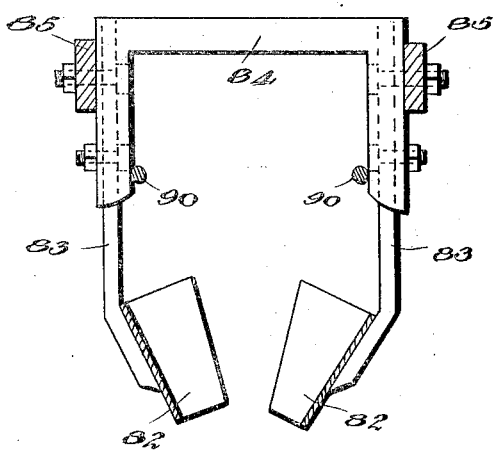
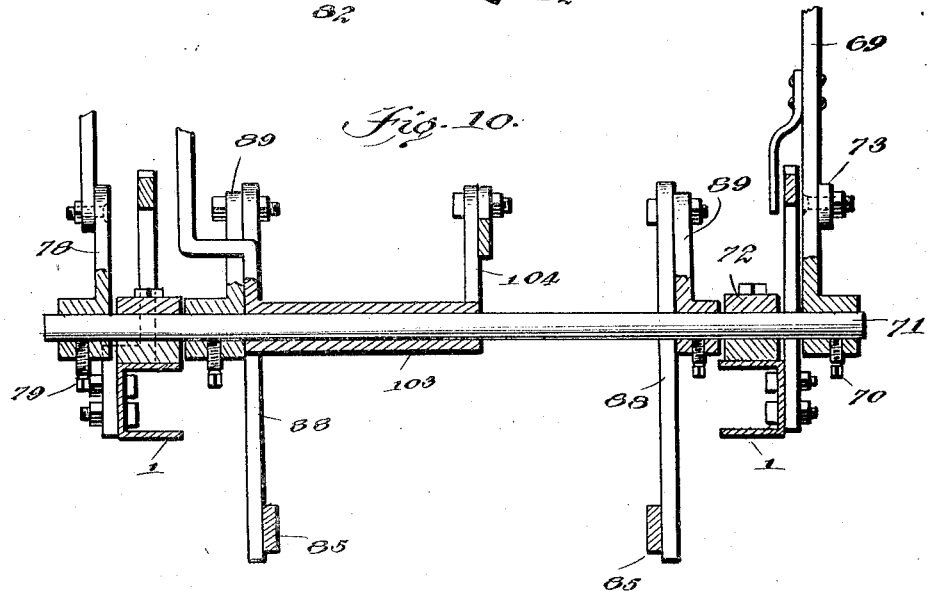
WITNESSES
INVENTOR
E. J. Hammer
O. H. Hammer
BY
ATTORNEYS Patented Mar. 8, 1927.

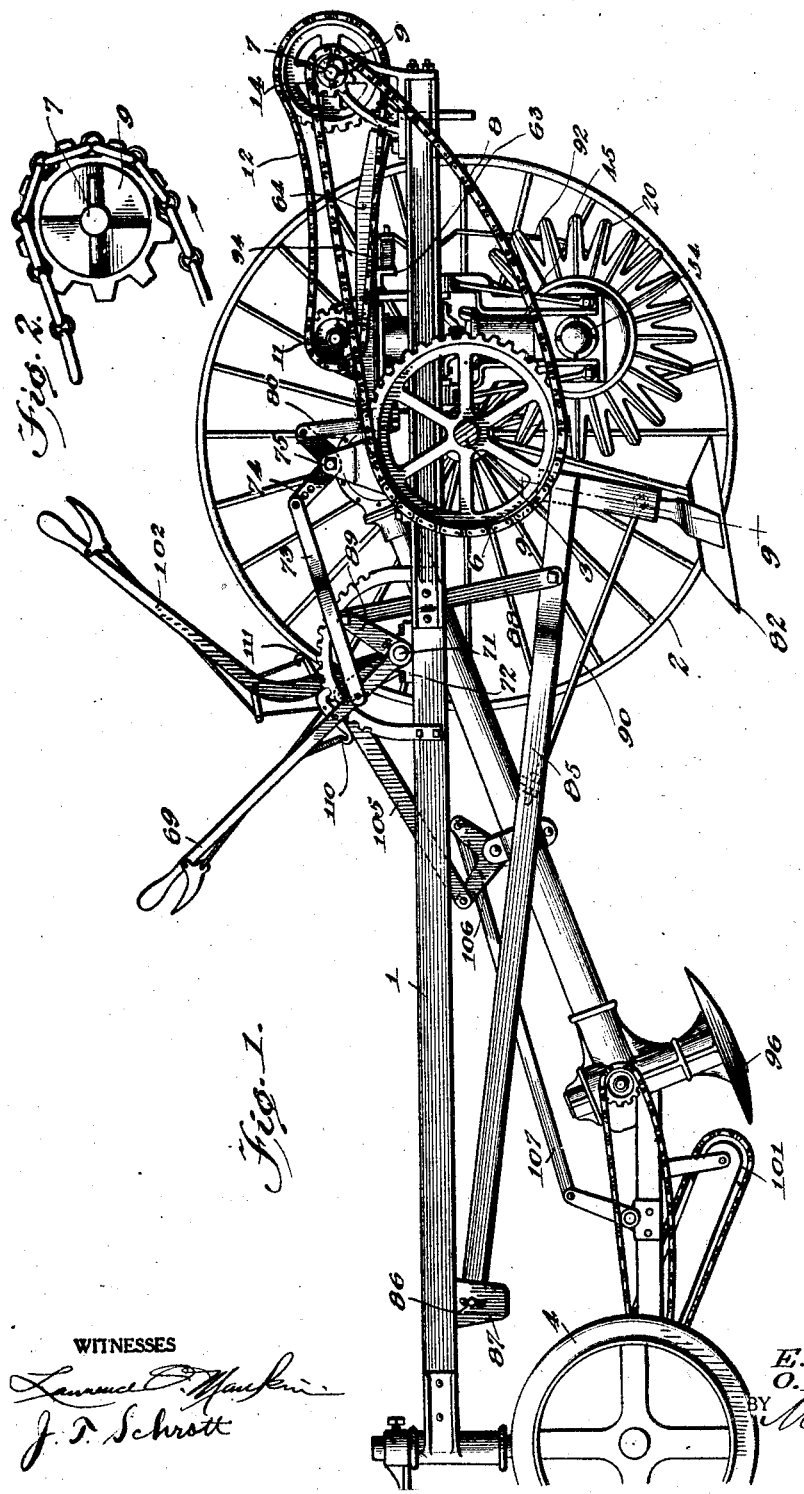

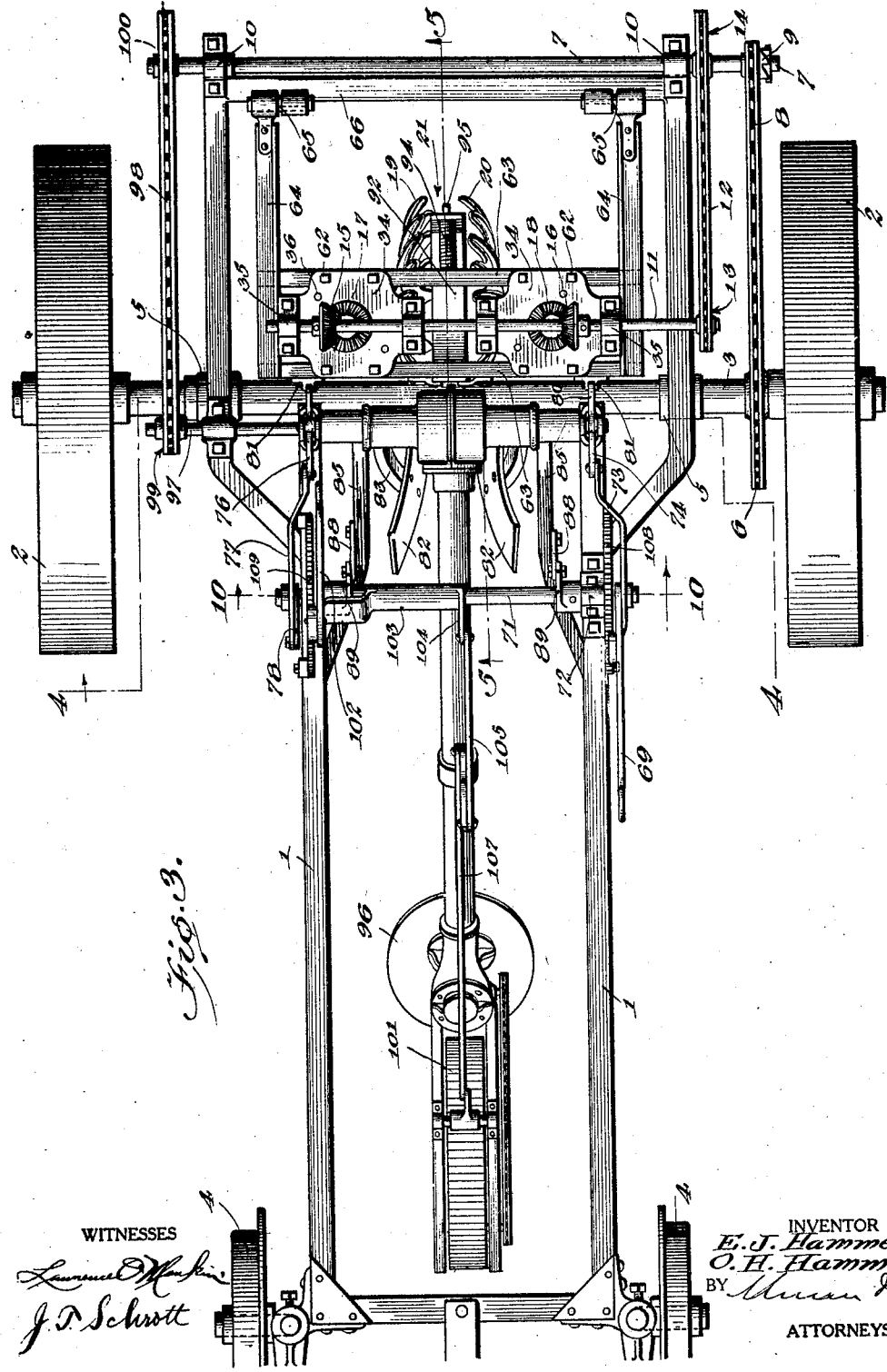

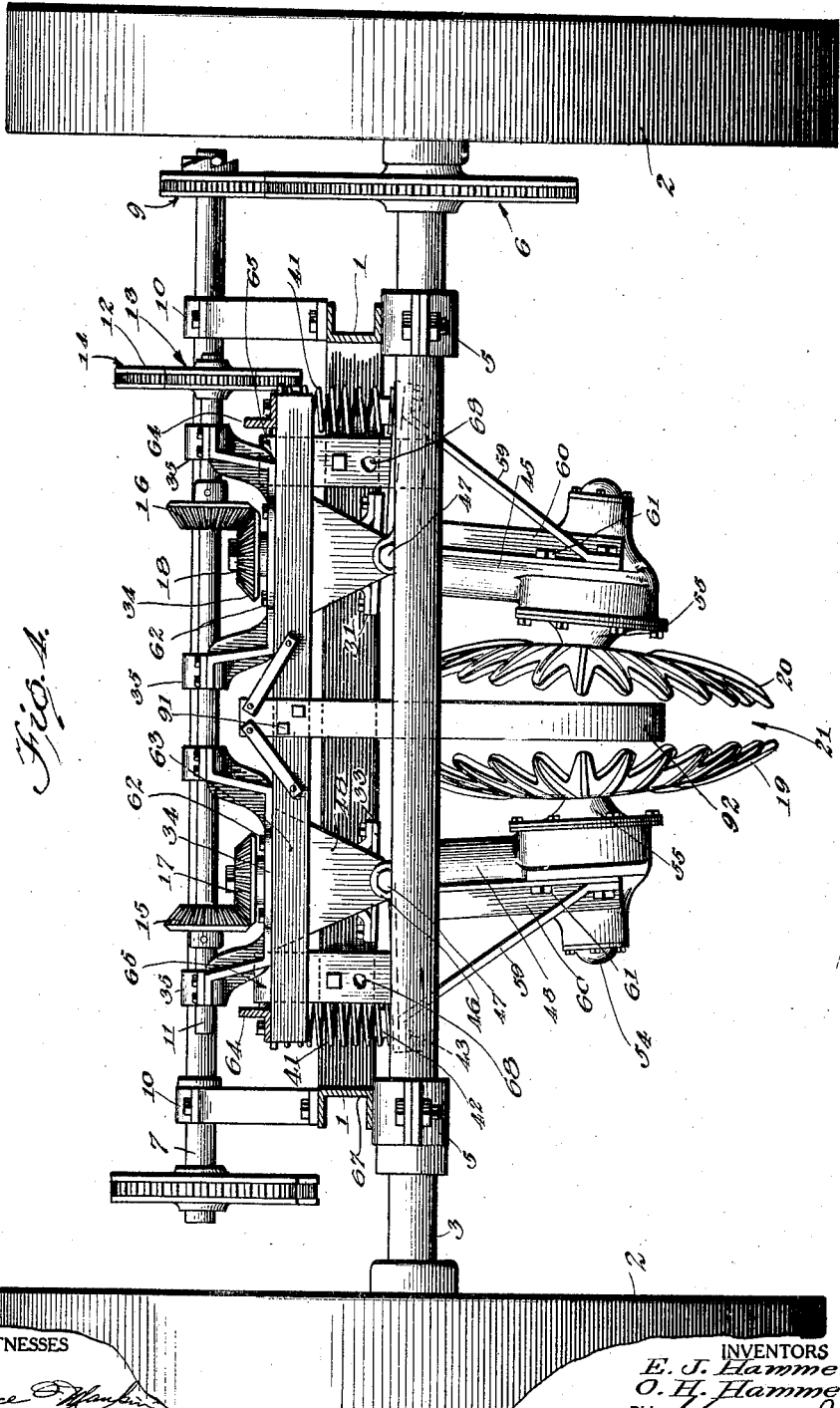

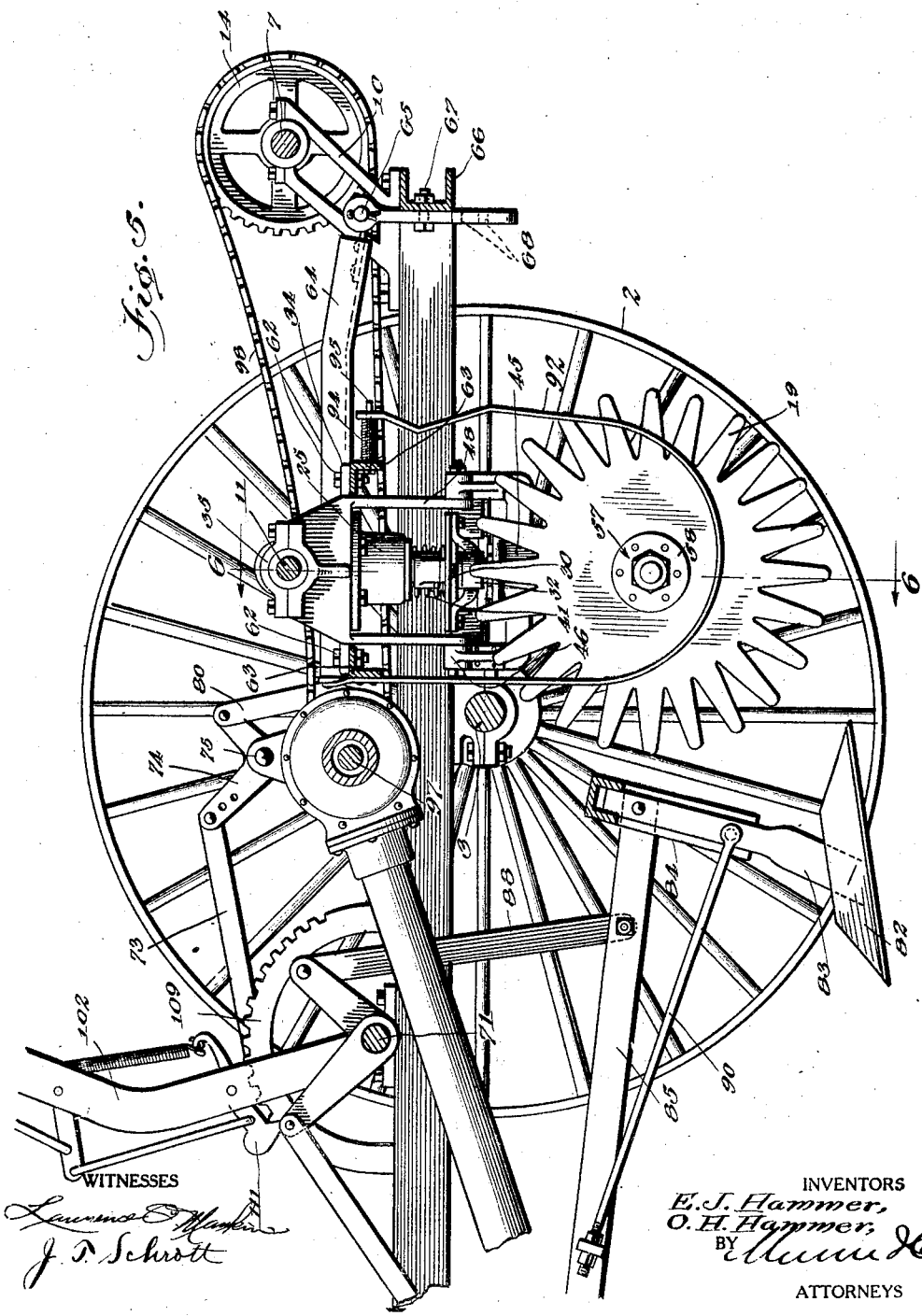

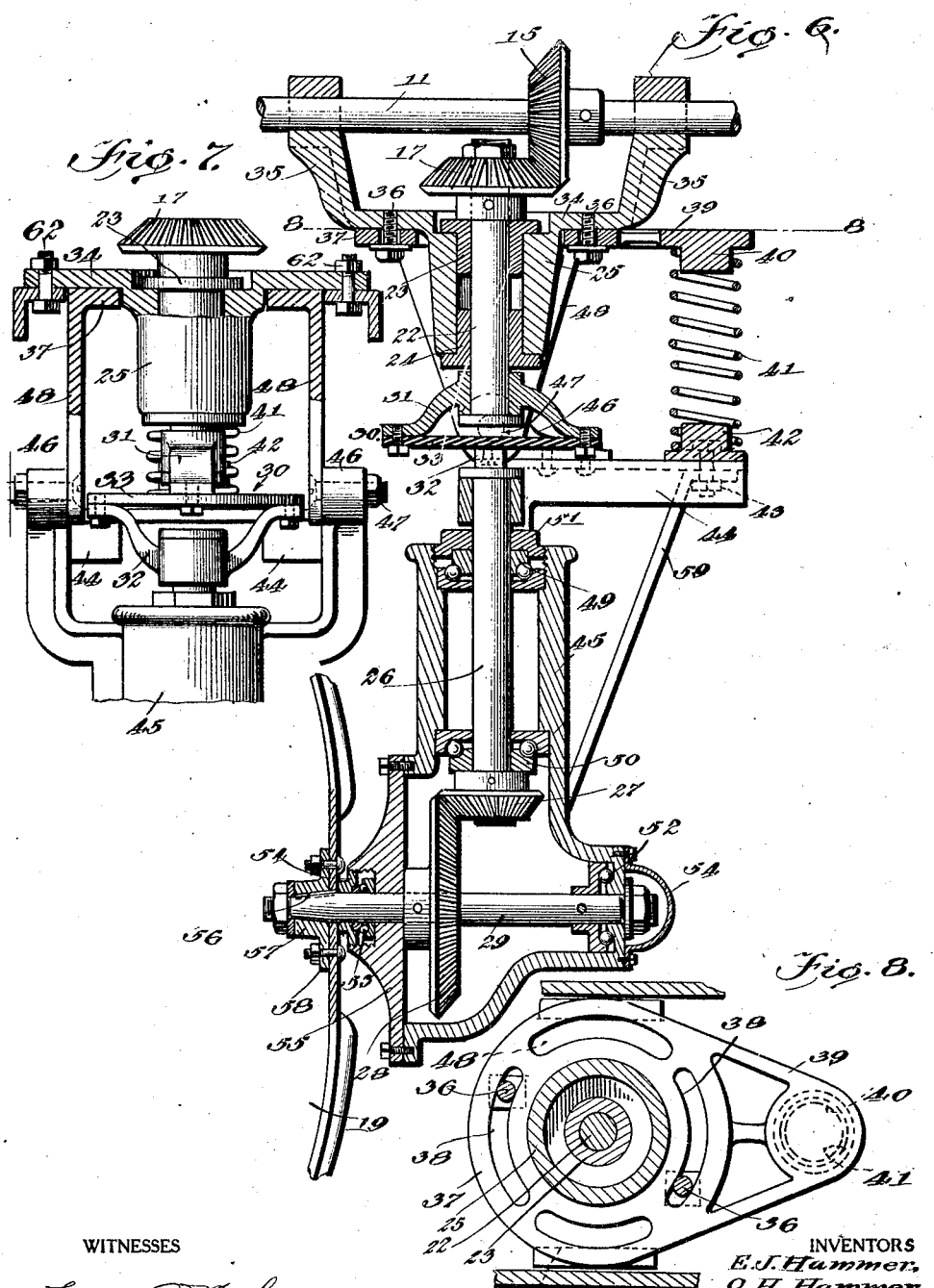

1,620,019

UNITED STATES PATENT OFFICE.

ERVIN J. HAMMER AND ORRIN H. HAMMER, OF MILLER CITY, OHIO.

BEET HARVESTER.

Application filed March 11, 1925. Serial No. 14,737.

This invention relates to improvements in beet harvesters, and it consists of the constructions, combinations and arrangements herein described and claimed.

An object of the invention is to provide an apparatus for use in conjunction with a beet topper for the purpose of lifting the topped beets out of the ground.

Another object of the invention is to provide a beet harvester having a pair of cooperating finger wheels which lift the beets out of the ground, said wheels being automatically adaptable to beets of various sizes so that none may escape the picking up action.

Another object of the invention is to provide means for so adjusting the finger wheels that the beet openings at the entering and discharging edges may be regulated to the size desired.

Another object of the invention is to provide a spring guard by means of which the beets are kept in predetermined relationship with the finger wheels, and by which they are discharged from the finger wheels at the appropriate time.

Other objects and advantages appear in the following specification, reference being had to the accompanying drawings, in which—

Figure 1 is a side elevation of a combined topper and harvester.

Figure 2 is a side elevation of the clutch sprocket on the main shaft.

Figure 3 is a plan view of the entire machine.

Figure 4 is a cross section on the line 4—4 of Figure 3.

Figure 5 is a central vertical section of the harvester being taken substantially on the line 5—5 of Figure 3.

Figure 6 is a detail section of one of the finger wheels and drive mechanism, being taken on the line 6—6 of Figure 5.

Figure 7 is a detail elevation, partly in section, of the top bearing and universal joint arrangement of the upper and lower finger shafts.

Figure 8 is a detail horizontal section along the line 8—8 of Figure 6.

Figure 9 is a detail cross section on the line 9—9 of Figure 1.

Figure 10 is a detail section along the lever shaft, being taken substantially on the line 10—10 of Figure 3.

Reference may be had to the Letters Patent of Irvin J. Hammer, March 30, 1926, 1,578,283. This application fully discloses the topper with which the harvester of this application cooperates. The beet topper is referred to herein only in a general way.

The main frame 1 of the machine is supported at the rear by tractor wheels 2, which run with the axle 3, and at the front by a pair of smaller wheels 4, which, in practice, are capable of being turned in such a manner as to guide the machine.

Suitable journals 5 (Fig. 4) provide bearings for the axle. These journals are carried by the main frame 1.

A large sprocket 6 on the axle 3 provides the driving power for the main shaft 7 through a chain 8. The chain drives a clutch sprocket 9 on the main shaft, this sprocket being of such nature that driving power is imparted to the main shaft 7 only during forward motion of the machine. The clutch sprocket slips when the machine is reversed or backed.

Bearings 10 (Figs. 3, 4 and 5) support the main shaft 7 upon the rearward extension of the main frame, that is to say that part of the main frame that extends beyond the axle 3. The countershaft 11 is driven from the main shaft 7 by means of a chain 12 and sprockets 13 and 14 upon the respective shafts.

Pinions 15 and 16 on the countershaft 11 drive pinions 17 and 18 of the finger wheels 19 and 20. Both finger wheels and the operating mechanism thereof are identical in construction so that the description of one will suffice for both. It is to be observed that the finger wheels occupy confronting positions (Figs. 3 and 4) producing a passage 21 which is traversed by the topped beet.

It is to be borne in mind that the purpose of the finger wheels is to pick up the topped beets from the ground, carry them rearwardly and deposit them into such receptacle as may be provided. Both finger wheels must rotate in harmony and in the same direction. It is to this end that the countershaft 11 (Fig. 3) and its various gears are provided.

Refer now to Figure 6. The driven pinion 17 is secured to the upper finger shaft 22 which is journaled in top and bottom bearings 23 and 24 in a supporting casting 25. A lower extension 26 of the finger shaft carries a pinion 27 which drives a bevel gear 28 of the finger wheel axle 29. The upper and lower shafts are connected by a universal joint 30 which is composed of brackets 31 and 32 upon the respective shafts, these being secured to a flexible disk 33 which completes the universal joint.

The supporting casting 25 is part of a plate 34 which has a pair of upwardly extending arms 35 upon which the countershaft 11 is journaled. The arrangement is mutual. The countershaft has bearing upon the arms 35, and the finger wheel 19 and its entire operating mechanism are suspended from the countershaft at the arms 35.

Bolts 36 secure a disk 37 beneath the plate 34. This disk (Fig. 8) has arcuate slots 38 through which the bolts pass. The disk is capable of adjustment in a circular direction upon loosening the bolts. An extension 39 of the disk 37 has a boss 40 around which the upper end of a spring 41 is seated. The lower end of the spring is seated around a confronting boss 42, suitably secured at 43 to a pair of lateral extensions 44 of the housing 45. The lateral extensions 44 are substantially coextensive with the extension 39. They have lugs 46 which are pivoted or hinged at 47 to ears 48 which extend down from the plate 37. The hinge 47 provides for rocking motion of the housing 45 and its carried parts. The spring 41 presses the finger wheel 19 toward the left (Fig. 6). The springs of both finger wheels move them toward each other and thus produce the necessary grip upon the beets to carry them around. The rocking motion of the hinge 47 occurs when the beets of various sizes are brought up by the finger wheels.

Bearings 49 and 50 (Fig. 6) support the lower finger shaft 26 within the housing 45. These are thrust bearings. The upper bearing 49 is protected by a cap 51 which prevents the entrance of dust and other foreign substances. The finger wheel axle 29 is journaled upon bearings 52 and 53, both bearings being protected by suitable dust caps or covers 54. The bearing 53 occupies a position in the cover plate 55 through which access to the interior of the housing 45 may be had upon occasion. A key 56 secures a hub 57 upon the exposed end of the axle 29. It is to the flange 58 of this hub that the finger wheel is riveted or otherwise secured as shown. A brace 59, reaching from the extremity of the arms 44 and a portion of the housing 45 holds the pair of arms in rigid position. The lateral extensions 44 are part of irons 60 which extend down beside the housing 45 and are secured thereto at 61. The arrangement by which the lateral extensions 44 are mounted is subject to variation.

The plates 34 of the castings 25 are secured at 62 (Figs. 3 and 4) to the parallel angle members 63 of a movable frame 64.

Hinges 65 provide the movable support for the frame. These hinges are carried by a cross piece 66 of the main frame 1 (Fig. 3). The hinges are adjustable upon the cross piece, the securing bolts 67 being capable of fitting into any one of the series of holes 68 (Fig. 5) in the upright part of the hinge. Movement is imparted to the frame 64 by a lever 69 (Figs. 1 and 10) which is fixed at 70 to the shaft 71, known as the lever shaft. This shaft is journaled at 72 upon the main frame 1.

A link 73 extends rearwardly from the lever 69 and makes connection with one arm of a bell-crank 74 which is pivoted at 75 to a fixed part of the framework. One arm of a similar bell-crank 76 on the opposite side of the machine has connection through a link 77 (Fig. 3) with a short arm 78 which is secured at 79 to the opposite end of the lever shaft (Fig. 10). Movement of the lever 69 operates both bell-cranks simultaneously.

Links 80 connect the other arms of the bell-cranks 74 and 76 with brackets 81 (Fig. 3) on the free side of the frame 64. It is obvious that the links 80 support the movable frame 64 and that upon shifting of the lever 69 movement is imparted to the frame 64 in the vertical direction. It is by this means that adjustment of the finger wheels 19 and 20 is had in respect to the ground.

Adjustment of a pair of lifting plows 82 occurs simultaneously with the adjustment of the movable frame 64. These plows are for the purpose of lifting the topped beets sufficiently far out of the ground to enable the finger wheels to grip them. The plows are carried by arms 83 (Fig. 9) which are secured in a yoke 84, in turn secured to a pair of bars 85 which extend forwardly and have a pivotal mounting at 86 to a clip beneath the main frame. Links 88 connect the bars with arms 89 fixed upon the lever shaft. It is clear that turning of the lever shaft 71 by means of the lever 69 will produce a simultaneous lifting of the finger wheels 19 and 20 and of the plows 82. Rods 90 provide braces between the bars 85 and the yoke 84.

Secured at 91 (Fig. 4) to the front cross angle 63 of the movable frame 64 is a tongue 92. This tongue extends down into the space 21 between the finger wheels where it curves rearwardly and upwardly as at 93 (Fig. 5). The free end of the tongue is intended to eject the beets from between the finger wheels. The tongue is resilient to a certain degree, but the beet-ejecting action is produced by a spring 94 (Fig. 5) which acts between the free end of the tongue and the adjacent cross angle 63 of the movable frame. A bolt 95 carries the spring. The free end of the tongue has an opening which receives the bolt, the free end of the tongue resting upon the bolt as the reader will readily understand. The bolt is fixed upon the cross member 63.

The beets are topped in the first instance by a disk 96 which is driven (according to the disclosure in the co-pending application) by a shaft 97. This shaft receives driving motion from a chain 98 which passes over sprockets 99 and 100 upon the shafts 97 and 7 respectively. The cutting action of the disk 96 is regulated by a gauge 101. The cutter disk and gauge are capable of raising and lowering motion by means of a lever 102 which is carried by a sleeve 103 upon the lever shaft 71. The sleeve has an arm 104 through which, and through suitable connections 105, 106, 107 (Fig. 1) raising and lowering motion of the parts desired is obtained by properly working the lever 102 back and forth.

Quadrants 108 and 109 hold the adjustment of the levers 69 and 102, each having a suitable detent 110 and 111 according to custom.

The operation may now be readily understood. Attention is first directed to Figure 3. It is to be observed that the finger wheels 19 and 20 stand at angles to each other so that the space 21 is wider at the front than it is at the rear. These disks also stand at angles to each other when viewed from a position either at the front or rear. This peculiar positioning of the finger wheels permits the fingers to gradually close upon the beets as the machine advances and maintains the grip as the beets are carried around on the outside of the tongue 92 (Fig. 5) until a sufficiently wide part of the space 21 is reached permitting ejection under the tension of the spring 94.

The first position of the finger wheels 19 and 20 is obtained by loosening the bolts 36 (Figs. 6 and 8) and turning the plates 37 until the finger wheels stand in the desired relative positions. The reader must remember that the turning of the plate 37 (Fig. 6) also accomplishes the turning of the ears 48, lateral extensions 44, housing 45 and all associated parts. The bolts 36 are again tightened when the desired adjustment has been reached. The second position of the finger wheels 19 and 20 (Fig. 4) is produced by the springs 41. These press downwardly upon the lateral extensions 44 and tend to swing the finger wheels toward each other upon the hinge mountings 46. The springs yield when the finger wheels approach large beets, the springs 41 being sufficiently strong to crush any clods that might adhere to the beets, but are not so strong as to injure the beets themselves.

It is intended that the speed of the finger wheels shall be so adjusted that they shall handle only one beet at a time. This is obviously necessary because if the finger wheels were carrying a small beet around and then started to pick up a large beet, the resulting spreading of the finger wheels would cause the dropping of the small beet. It is to be observed that the finger wheels permit cleaning of the beets to some extent, the loose earth dropping thru them. Simultaneous adjustment of the finger wheels and plows are made by manipulating the lever 69. The links 73, actuated by this lever, move the frame 64 up and down upon its hinges 65 (Fig. 3) and the links 88 move the bars 85 up and down upon the pivotal mountings 86 (Fig. 1). The plows and finger wheels are thus capable of being set in the desired positions in respect to the ground. The reader will remember that it is the tendency of the springs 41 to move the finger wheels toward each other. The lower finger shafts 26 thus assume angled relationships to the upper finger shafts 22. But the interposed universal joint 33 compensates for this relationship and serves to properly transmit the driving motion.

While the construction and arrangement of the improved beet harvester is that of a generally preferred form, obviously modifications and changes may be made without departing from the spirit of the invention or the scope of the claims.

We claim:—

1. A beet harvester comprising a pair of finger wheels, movably mounted means supporting the finger wheels in confronting positions, means to continuously rotate them in the same direction upon said supporting means to take hold of a beet and carry it to a point of discharge, and resilient means exerting pressure upon said supporting means urging the wheels toward each other so that various sizes of beets are gripped equally well.

2. A beet harvester comprising a pair of finger wheels, axles carrying the finger wheels, means rotatably supporting the finger wheels in confronting positions, and resilient means exerting such pressure upon said supporting means as tends to move the axles toward each other and the wheels together but permits yielding of the supporting means in the opposite direction thereby separating the wheels to accommodate all sizes of beets.

3. A beet harvester comprising a pair of confronting finger wheels, pivoted housings upon which the finger wheels are rotatably mounted, and resilient means exerting pressure upon the housings so that they rock upon their pivots and move the finger wheels together, said resilient means being capable of yielding upon a reverse rocking motion of the housings when a large size beet is gripped by the finger wheels.

4. A beet harvester comprising a confronting pair of finger wheels, pivotally mounted housings by which the finger wheels are carried, means to rotate each finger wheel including a two-part shaft carried by each housing, resilient means to rock the housing upon its pivot tending to move the finger wheels together, and a universal joint connecting the two-part shaft being situated in the vicinity of the housing pivot, permitting said rocking motion and insuring continuous rotation of the finger wheels.

5. A beet harvester comprising a confronting pair of finger wheels, pivoted housings by which the respective wheels are carried, and resilient means exerting pressure upon the housings to rock them upon their pivots, and move the finger wheels toward each other thereby producing a space therebetween which is narrow at the bottom and wide at the top.

6. A beet harvester comprising a confronting pair of finger wheels, pivotally mounted housings by which the respective finger wheels are carried, means to rock the housings upon their pivots moving the finger wheels toward each other making the intervening space narrower at the bottom than at the top, and means permitting adjustment of the housings to so set the finger wheels that the space therebetween is different at the front from the rear.

7. A beet harvester comprising a confronting pair of finger wheels, housings upon which the finger wheels are rotatably mounted, castings upon which the housings have pivotal support, and springs so disposed between the supporting castings and housings as to rock and permit rocking of the housings upon their pivots thereby providing for yielding of the finger wheels when beets of various sizes are gripped.

8. A beet harvester comprising a confronting pair of finger wheels, housings upon which the wheels are rotatably mounted, relatively fixed supporting castings, springs exerting tension against the housings tending to move the finger wheels toward each other, plates against which the springs have abutment, ears pendant from the plates upon which the housings have pivotal mounting permitting the necessary rocking motion under the influence of said springs, and means by which the plates are adjusted in respect to the castings to vary the spaces between the front and rear edges of the finger wheels.

9. A beet harvester comprising a confronting pair of finger wheels, housings by which they are rotatably carried, supports upon which the housings are pivotally mounted, a frame from which the supports are suspended, a hinge mounting for the frame, and means to move the frame upon its hinges causing a bodily raising and lowering of the finger wheels.

10. A beet harvester comprising a finger wheel, a housing upon which it is rotatably mounted, a relatively fixed supporting casting, lateral extensions upon the housing, a spring bearing against the lateral extensions tending to move the finger wheel in one direction, a plate having an extension against which the spring has abutment, ears upon the plate to which the housing is pivotally attached permitting rocking motion under influence of the spring, and means by which the plate is adjustably attached to the supporting casting permitting setting the plate and its carried parts at various positions in respect to the casting so that various positions of the finger wheel may be had.

11. A beet harvester comprising a finger wheel, a supporting casting, a housing, a two-part drive shaft comprising upper and lower finger shafts respectively journaled in the casting and housing, an axle journaled in the housing carrying the finger wheel, gearing driving the axle from the lower finger shaft, means upon which the housing is pivotally mounted permitting rocking motion of the finger wheel, and a universal joint connecting the upper and lower finger shafts so that there may be continuous driving motion regardless of the position of the housing.

12. A beet harvester comprising a finger wheel, a supporting casting, a housing, a two-part drive shaft comprising upper and lower finger shafts respectively journaled in the casting and housing, an axle journaled in the housing carrying the finger wheel, gearing driving the axle from the lower finger shaft, means upon which the housing is pivotally mounted permitting rocking motion of the finger wheel, a universal joint connecting the upper and lower finger shafts so that there may be continuous driving motion regardless of the position of the housing, a plate carried by the supporting casting, an extension upon the housing, a spring disposed between said plate and extension tending to rock the housing upon its pivots in one direction, and means both upon the plate and extension upon which the spring is held in position.

13. In a beet harvester, a rotatable finger wheel, means including a housing by which the wheel is carried, a casting furnishing support for the housing, a plate from which the housing is suspended being applied to a portion of the casting and having a pair of arcuate slots, and securing bolts passing through the slots and casting securing the plate but permitting circumferential adjustment.

14. A beet harvester comprising a main frame, a main drive shaft journaled thereupon, a movable frame hinged upon the main frame, a counter-shaft carried by the movable frame, sprocket and chain connections between the shafts for driving one from the other, drive pinions upon the countershaft, castings mounted upon the movable frame furnishing bearings for the countershaft, a confronting pair of finger wheels, means by which the finger wheels are rotated in the same direction from the drive pinions upon the countershaft, and means for supporting the movable frame at various adjustments on the main frame thereby holding the finger wheels in the desired relationship to the ground.

15. A beet harvester having a confronting pair of rotating finger wheels being so disposed as to leave a space therebetween, a tongue having a curved portion occupying said space against which the topped ends of beets ride, and resilient means which is put under tension as they traverse the space to a predetermined point and causes such movement of the tongue as will eject the beet when it has traveled farther into the space.

16. A beet harvester having a confronting pair of rotating finger wheels being disposed to produce a space through which a topped beet passes, a relatively fixed tongue having a curved portion occupying said space, a fixed bolt upon which the free end of said curved tongue has guidance, and a spring upon the bolt being put under compression by said tongue as the beet advances a predetermined distance around said space, said spring then acting against the tongue to cause ejection of a beet from the space as it travels farther around.

17. A device of the character described comprising a frame, apparatus swung from the frame and being operated to top beets, a plow to uproot the topped beets, a pair of finger wheels to pick up the beets and carry them to a point of disposal, a lever shaft having connection for simultaneously raising the plow and finger wheels, a sleeve journaled upon the lever shaft, means to turn the sleeve, and connections from the sleeve to raise the topper upon said turning.

18. A beet harvester comprising a hingedly mounted movable frame, a pair of angle connectors in spaced relationship, a pair of castings fastened in place to said angle connectors, a pair of finger wheels supported by said castings, a countershaft journaled upon said castings, means to drive the finger wheels from the countershaft, and means to raise and lower the movable frame while said driving continues.

ERVIN J. HAMMER.
ORRIN H. HAMMER.